(12) United States Patent
Jensen (10) Patent No.: US 12,148,052 B2
(45) Date of Patent: Nov. 19, 2024

(54) LOCAL PRODUCTIVITY PREDICTION AND MANAGEMENT SYSTEM

(71) Applicant: Smarta Industrial Pty Ltd, Cranbourne (AU)

(72) Inventor: Ashley Jensen, Cranbourne (AU)

(73) Assignee: Smarta Industrial Pty Ltd, Cranbourne (AU)

( * ) Notice: Subject to any disclaimer, the term of this patent is extended or adjusted under 35 U.S.C. 154(b) by 0 days.

(21) Appl. No.: 17/581,780

(22) PCT Filed: Aug. 29, 2020

(86) PCT No.: PCT/AU2020/000093
§ 371 (c)(1),
(2) Date: Jan. 21, 2022

(87) PCT Pub. No.: WO2021/011991
PCT Pub. Date: Jan. 28, 2021

(65) Prior Publication Data
US 2022/0343439 A1   Oct. 27, 2022

(30) Foreign Application Priority Data

Jul. 24, 2019 (AU) ............................... 2019902618

(51) Int. Cl.
*G06Q 50/02* (2024.01)
*A01K 29/00* (2006.01)
(Continued)

(52) U.S. Cl.
CPC .............. *G06Q 50/02* (2013.01); *G01W 1/02* (2013.01); *G01W 1/10* (2013.01); *G01W 1/14* (2013.01);
(Continued)

(58) Field of Classification Search
CPC .. G06Q 50/02; G06Q 10/0637; G06Q 10/087; G06Q 50/28; G01W 1/02;
(Continued)

(56) References Cited

U.S. PATENT DOCUMENTS 9,009,087 B1 *  4/2015  Mewes ................ G06Q 10/067
                                                                706/12
10,122,806 B1 * 11/2018  Florissi ................... G06F 16/25
(Continued)

FOREIGN PATENT DOCUMENTS

CN          104331836 A   *  2/2015

OTHER PUBLICATIONS

Frost (Understand Precision in Predictive Analytics to Avoid Costly Mistakes, Statistics by Jim, Mar. 5, 2019, https://web.archive.org/web/20190305060425/http://statisticsbyjim.com/regression/prediction-precision-applied-regression/) (Year: 2019).*

(Continued)

*Primary Examiner* — Manish S Shah
*Assistant Examiner* — Christian T Bryant
(74) *Attorney, Agent, or Firm* — Chernoff, Vilhauer, McClung & Stenzel LLP (57) ABSTRACT

A local productivity prediction and management system including a weather monitoring device and a productivity prediction device. The weather monitoring device 10 including at least one of the following sensors adapted to take weather measurements of local weather conditions. The sensors include a temperature sensor 12, a humidity sensor 13, a rainfall sensor 14 and a sunlight and/or ultraviolet light sensor 15. Wherein, the productivity prediction device is adapted to over time collect local actual livestock production values. The productivity prediction device is also adapted to apply a productivity prediction model which uses one or more correlating patterns between weather measurements (Continued)

and actual livestock production values, whether either are local and/or offsite to provide a set of one or more predicted livestock production values. The productivity prediction device is also adapted to manage a logistical function of livestock product collection and transport with regard to capacity and timing in response to the predicted livestock production value.

15 Claims, 4 Drawing Sheets

(51) Int. Cl.
    *G01W 1/00*     (2006.01)
    *G01W 1/02*     (2006.01)
    *G01W 1/10*     (2006.01)
    *G01W 1/14*     (2006.01)
    *G06Q 10/04*     (2023.01)
    *G06Q 10/0637*     (2023.01)
    *G06Q 10/087*     (2023.01)
    *G16Y 10/05*     (2020.01)

(52) U.S. Cl.
    CPC ......... *G06Q 10/04* (2013.01); *G06Q 10/0637* (2013.01); *G06Q 10/087* (2013.01); *A01K 29/00* (2013.01); *G01W 1/00* (2013.01); *G01W 2001/006* (2013.01); *G16Y 10/05* (2020.01)

(58) Field of Classification Search
    CPC ... G01W 1/10; G01W 1/14; G01W 2001/006; G01W 1/00; G16Y 10/05; A01K 29/00
    See application file for complete search history.

(56) References Cited

U.S. PATENT DOCUMENTS

| | | | |
|---|---|---|---|
| 2008/0097809 A1* | 4/2008 | Stroman | G06Q 30/018 |
| | | | 705/35 |
| 2009/0083206 A1* | 3/2009 | Shigemori | G06Q 50/04 |
| | | | 706/46 |
| 2018/0320967 A1* | 11/2018 | Kaloudis | G06Q 10/06315 |
| 2019/0041845 A1* | 2/2019 | Cella | G06N 7/01 |
| 2019/0050510 A1* | 2/2019 | Mewes | G06N 3/045 |
| 2019/0180289 A1* | 6/2019 | Klavins | G06Q 50/02 |

OTHER PUBLICATIONS

Bertsimas et al. (OR Forum—An Algorithmic Approach to Linear Regression. Operations Research. 2016. 64(1):2-16. http://dx.doi.org/10.1287/opre.2015.1436) (Year: 2016).*

Hennessy et al. (Relationships between meteorological data and grass growth over time in the south of Ireland. Irish Geography. 46. 175-201. 10.1080/00750778.2013.865364. 2013) (Year: 2013).*

Elijah et al. ("An Overview of Internet of Things (IoT) and Data Analytics in Agriculture: Benefits and Challenges," in IEEE Internet of Things Journal, vol. 5, No. 5, pp. 3758-3773, Oct. 2018, doi: 10.1109/JIOT.2018.2844296) (Year: 2018).*

* cited by examiner

LOCAL PRODUCTIVITY PREDICTION AND MANAGEMENT SYSTEM

FIELD OF INVENTION

This invention relates to a local productivity prediction and management system. More particularly, this invention relates to a local productivity prediction and management system including predicting livestock production and managing a logistical function.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor(s) and in the understanding of the invention.

Cows often produce very different quantities of milk each day depending on the weather. This may result in unpredictable quantities of milk delivered to processing factories and stores. Furthermore, producers, farms, factories and stores may plan for quantities of milk that turn out to be different to what is produced at a local level by associated dairies, severally and/or collectively. This may result in poorly matched logistics compared to local and regional production levels along the delivery, production and supply chain. For example, milk tankers may be required to wait unexpectedly long periods of time for milk vats to empty, milk transport may be over-supplied for the actual production level at a local or regional level, and milk vats may be underutilised only containing a small amount of milk for periods of time.

An object of the present invention is to ameliorate one or more of the aforementioned disadvantages of the prior art or to at least provide a useful alternative thereto.

STATEMENT OF INVENTION

The invention according to one or more aspects may be as defined in the independent claims. Some optional and/or preferred features of the invention are defined in the dependent claims.

Accordingly, in one aspect of the invention there is provided:

A local productivity prediction and management system including a weather monitoring device and a productivity prediction device, the weather monitoring device including at least one of the following sensors adapted to take weather measurements of local weather conditions:
  a temperature sensor;
  a humidity sensor;
  a rainfall sensor; and
  a sunlight and/or ultraviolet light sensor,
wherein, the productivity prediction device is adapted to:
  (a) over time collect local actual livestock production values;
  (b) apply a productivity prediction model which uses one or more correlating patterns between weather measurements and actual livestock production values, whether either are local and/or offsite, to provide a set of one or more predicted livestock production values; and
  (c) manage a logistical function of livestock product collection and transport with regard to capacity and timing in response to the predicted livestock production value.

Preferably, the productivity prediction device is adapted to:
  (d) adjust the productivity prediction model to increase accuracy of the set of predicted livestock production values and the correlating patterns compared to actual local livestock production values; and
  (e) establish the one or more correlating patterns between the periodic weather measurements from the weather monitoring device and the actual livestock production values.

Most preferably, the productivity prediction model is in the form of a software package, program or app adapted to be installed on the productivity prediction device.

Local and Offsite

The weather measurements or weather conditions being local may be weather measurements recorded by the weather monitoring device and/or local weather predictions from an area in which at least some of the sensors are located. The weather measurements being offsite may be any weather measurement not recorded by the sensors.

The actual livestock production values being local may be actual livestock production values of livestock on a farm or property in which at least some of the sensors are located. The actual livestock production values being offsite may be any actual livestock production values of livestock not on the farm or property in which at least some of the sensors are located.

Logistical Function

The logistical function may be an aspect of agricultural or livestock production, collection, transport and/or supply. The logistical function may be the determination of optimal transport routes for agricultural or livestock produce collection and delivery to production plants. The system may create vehicle routes for the pickup of agricultural or livestock produce from multiple local producers, configured to accommodate variations in required capacity and timing corresponding to the predicted livestock production value.

Preferably, the productivity prediction device includes a computer. Preferably, the computer calculates the schedule routes for vehicles picking up livestock produce from at least one farm with a view to pick up the maximum amount of livestock production for each vehicle and for the vehicles to travel the shortest distance. The computer may include the cloud platform, server, sensor device, user's electronic device or another computer. Preferably, the computer is a server. The computer may also schedule times for the vehicle routes. The computer may account for the times that the harvested livestock produce is ready for pickup by the vehicles. The computer may also schedule the times when the farms should harvest the livestock produce.

The system may also include a vat monitoring device which monitors the amount of livestock produce in at least one vat. The computer may schedule vehicle routes also depending on the amount of livestock produce in the at least one vat.

The logistical function may also schedule vats and/or other livestock produce storage containers/areas not on the farm to have a capacity at a time adapted to correspond to the predicted livestock production value and vehicle routes.

Weather Monitoring Device

Preferably, the weather monitoring device (sensor device) is positioned within the borders of a farm. Preferably, the sensor device is positioned close to the location of livestock on the farm. The sensor device may be positioned on a tree, a shed, a house and/or in a field of a farm. Different sensors of the sensor device may be positioned in different locations. The sensors may be positioned directly onto a shed or existing structure. Preferably, the sensors are positioned on a support. Preferably, the support is mounted near a power source. The support may be mounted at a height above or below 1 m above ground level. Preferably, the support is positioned above 1 m above ground level. The support may be any support. The support may include a beam, housing/container and other structures. Preferably, the support includes a beam with a 90° bend.

The system and/or sensor device may be powered by grid power, solar panels, wind turbines, batteries and/or other power sources. Parts of the system may be powered by different power sources to other parts of the system.

The system may include multiple sensor devices. The multiple sensor devices may be positioned in different locations on the farm. Each of the multiple sensor devices may include a temperature sensor, humidity sensor, rainfall sensor and/or a sunlight/ultraviolet sensor (sensors). At least one of the multiple sensor devices may be a redundant sensor device. The sensor device may include multiple temperature sensors, humidity sensors, rainfall sensors and sunlight/ultraviolet sensors. At least one of the multiple sensors may be redundant. The sensor device may further include a wind speed sensor and air quality sensors such as a carbon dioxide or methane sensor.

The sensor device may include a central processing unit (CPU), relays, communications module, display, buttons, switches, indicator lights and other electronic components. The communications module may include a Wi-Fi module and/or a cellular network module. The cellular network module may be adapted to communicate through the cellular network. The communications module may be adapted to connect to the internet through satellite internet. The communications module may include a satellite dish or other device to communicate with a satellite. The communications module may include an ethernet port to connect to the internet. The sensor device may log weather measurements (measurements) from the sensors. Therefore, the measurements may include temperature, humidity, rainfall, and intensity of sunlight. The sensor device may log the time and date when each measurement was taken.

The measurements may be periodic. The measurements may also include predicted data such as predicted temperature, humidity, rainfall and intensity of sunlight. The predicted data may be taken from external sources such as news websites, government weather prediction websites and other sources. Therefore, the measurements may also be taken from sources external to the weather monitoring device. The productivity prediction device may be adapted to establish one or more correlating patterns between periodic weather measurements and actual livestock production values. Wherein, the weather measurements may be taken from the weather monitoring device and external sources.

Temperature Sensor

The temperature sensor may include any type of temperature sensor which can measure typical atmospheric temperatures. The temperature sensor may include a negative temperature coefficient (NTC) thermistor, resistance temperature detector (RTD), thermocouple and/or a semiconductor-based sensor. The temperature sensor may include an infrared/thermal camera.

The temperature sensors may be located in a position which may be exposed to sunlight. Preferably, the temperature sensors are located in a shaded position. Preferably, the temperature sensor is exposed to ambient air.

Humidity Sensor

The humidity sensor may include any type of humidity sensor which can measure typical atmospheric humidity. The humidity sensor may include a capacitive sensor, resistive sensor and/or a thermal conductivity sensor. Preferably, the humidity sensor is exposed to ambient air.

Rainfall Sensor

The rainfall sensor may include any type of rainfall sensor. The rainfall sensor may include a radar precipitation sensor, weighing precipitation gauge, tipping bucket rain gauge, optical rain gauge and/or an acoustic rain gauge.

Sunlight/Ultraviolet Sensor

The sunlight and/or ultraviolet sensor may include any sunlight/ultraviolet sensor capable of measuring intensity of sunlight and/or ambient light. The sunlight and/or ultraviolet sensor may include photovoltaic sensors, photoresistors and/or photodiodes. The intensity of sunlight may be measured in lux.

Local Productivity Prediction and Management System

The system may be adapted for agriculture or livestock. Therefore, the actual livestock production value may be an actual agriculture production value. The predicted livestock production value may be an agriculture production value. The logistical function may be adapted to manage a logistical function of agriculture product collection.

The system may include an external computer, which is adapted to communicate with the sensor device. The productivity prediction device may include the external computer. The external computer may be adapted to receive and log measurements from the sensors remotely through the internet. The external computer may be adapted to store the measurements and time and date the measurements were taken. The productivity device may include the sensor device. The sensor device may be adapted to communicate with the external computer through the communications module. The external computer may be a computer adapted to be accessed by a server and/or cloud platform. The external computer may include a server and/or cloud platform.

The system may be adapted such that the predicted livestock production value, actual livestock production value and/or measurements can be viewed by the user on the display of the sensor device, on an application of a mobile electronic device and/or a website viewed on a computer or other device.

The system may be adapted such that the user and/or operator can adjust settings, which influence the productivity prediction model. The system may be adapted such that the user and/or operator can adjust the settings from the display/buttons of the sensor device, on an application of a mobile electronic device and/or on a website view on a computer or other device. The operator may be a professional who may not own the farm but be part of a company which sells the system or is paid to provide technical support to the user for the system. The settings may include any settings. The settings may include a size of the farm, distance of livestock from the sensor device, whether the farm irrigates and/or how much of the farm used by the livestock is irrigated. The settings may include elevation of the farm, the farm's terrain and the hilliness or flatness of the farm.

The settings may include how much of the farm is covered in trees and/or shrubs, the location of the farm. The settings may include the time and date. The system may be adapted to automatically update the time and date through the internet.

A method of utilising the weather monitoring system may include the step of receiving the predicted livestock production value of at least one farm and the step of scheduling a vehicle route with a view to pick up an optimum amount of livestock production for each vehicle, including optimising the travel route for the vehicle to travel the shortest distance. Preferably, a computer calculates the schedule routes for vehicles picking up livestock produce from at least one farm with a view to pick up the maximum amount of livestock production for each vehicle and for the vehicles to travel the shortest distance. The computer may include the cloud platform, server, sensor device, user's electronic device or another computer. Preferably, the computer is a server. The computer may also schedule times for the vehicle routes. The computer may account for the times that the harvested livestock produce is ready for pickup by the vehicles. The computer may also schedule the times when the farms can most optimally harvest the livestock produce.

Productivity Prediction Model

Application of the local productivity prediction and management system (system) may be used to develop the productivity prediction model over time. The system may result over time in an improved productivity prediction model. The model may be improved in that the productivity prediction model predicts predicted livestock production values closer to actual livestock production values of the same period of time. The same period of time may be, for example, for/on the same day. This productivity prediction model may be useful to provide a predictor as to the volume and quality of farm produce preparatory to a given period, such as a day, multiple days, weeks, months or even years. Preferably, over time the predictor provides an indication of expected productivity at least one to three days in advance of production for a particular day or other period. This may involve periodic feedback of the periodic weather measurements and the actual livestock production values to establish ever-increasingly accurate correlating patterns. This may continue until the law of diminishing returns makes further feedback redundant as the predictor model values converge with actual values. For example, the productivity prediction device may begin to provide useful predictions of productivity in a relatively short period of time (for example, 3 months), but continue to improve the accuracy of predicted livestock production compared to actual livestock production in ever-diminishing increments for several years. Advantageously, the productivity prediction device may be adapted to provide an accurate productivity prediction model on completion of one seasonal, normally annual, cycle.

The productivity prediction model is preferably adapted to affect the system by governing one or more logistical functions of agricultural product collection and transport.

The periodic weather measurements may be used to periodically predict a set of one or more livestock production values using the productivity prediction model. The productivity prediction model may be adapted to use the correlating patterns established between weather measurements from the weather monitoring device and actual livestock production values. The productivity prediction model may include input from at least one person using methods adapted to calculate the livestock production values. The external computer and/or sensor device may use the productivity prediction model, which is adapted to use the measurements taken over a period of time and actual livestock production values to predict the livestock production values. The period of time may be the time between each prediction of the one or more livestock production values. The period of time may be any past period of time. The period of time may be under 12 hours. The period of time may be between 12 hours and 24 hours. The period of time may be between 1 and 2 days. The period of time may be between 2 and 3 days. The period of time may be between 3 days and 1 week. The period of time may be between 1 week and 1 month. The period of time may be between 1 month and 1 year. The period of time may be between the present and when the measurements were first taken. The productivity prediction model may use the external computer and/or sensor device to perform the following calculations. The productivity prediction model may use at least one equation to convert the measurements to the livestock production value. The productivity prediction model may use at least one matrix and/or equation with matrices to convert the measurements to the livestock production value. The productivity prediction model may use other methods such as tables of values to convert the measurements to the livestock production value. The productivity prediction model may use averages of the measurements over the time period or at least one portion of the time period to convert the measurements to the livestock production value. The productivity prediction model may, automatically or manually by a user, adjust the at least one equation, matrices and/or tables of values based on actual livestock production values and measurements recorded by the farm or at least one other farm. The productivity prediction model may adjust the time period based on actual livestock production values and measurements recorded by the farm and/or at least one other farm.

Correlating Patterns

The one or more correlating patterns may be established by accumulating periodic or recurring predicted livestock production values for each sensor weather measurement taken at a particular time. The periodic or recurring predicted livestock production values for each sensor value may be matched with the actual livestock production values that follow a predetermined period of time later. The predetermined period of time may vary for each of the sensor weather measurements. Multiple predetermined periods of time may be used in the correlation between a particular sensor weather measurement and the resultant actual livestock production value. Multiple collected sensor weather measurements over stretches of time may be correlated with one or more actual livestock production values taken over one or more predetermined periods of time.

For example, consider the situation where the system is applied to a dairy farm and the correlations to be established are between the local temperature and the resultant milk productivity of the livestock.

Each morning and evening, the temperature sensor takes a temperature reading. Each morning and evening, the livestock is milked and actual livestock production values recorded. As the productivity prediction device accumulates more and more data, the correlation patterns between actual livestock production values and the temperature reading taken hours, days or weeks prior approaches a point of diminishing returns where the probability of change of the or each correlation pattern is at an acceptable level, for example with respect to the standard deviation. The preferred standard deviation may be represented in terms of a percentage value of between 0-10%, more preferably 0-5%, and most preferably 0-3%.

The correlating patterns may initially be established using weather measurements and actual livestock production values recorded and/or calculated external to the system and/or with other systems. The correlating patterns of the system may be modified using weather measurements and actual livestock production values recorded and/or calculated external to the system and/or with other systems.

The productivity prediction model may use artificial intelligence (AI) to adjust the itself based on the correlating patterns between the predicted livestock production value, actual livestock production value and measurements recorded by the farm and/or at least one other farm. The correlating patterns may include equations and/or trends between the measurements, actual livestock production values and/or predicted livestock production values. The AI may adjust the equations and/or independent variables of the equations using the correlating patterns between the predicted livestock production value, actual livestock production value and measurements for each farm individually.

Preferably, the equations include parameters and weightings of parameters. Preferably, the productivity prediction model runs algorithms to determine more accurate parameters and weightings of parameters to determine more accurate livestock production value/s.

The parameters may include any of the measurements. Preferably, the parameters include a grass growth index and a cow stress index. The grass growth index may be a function of variables including any of the measurements, average temperature, maximum temperature, minimum temperature, wind speed and/or other variables. The variables may be measured by the weather monitoring device. Preferable, the grass growth index is a function of rainfall, temperature and intensity of sunlight.

The cow stress index may be a function of variables including any of the measurements, average temperature, maximum temperature, minimum temperature, wind speed and/or other variables. Preferably, the cow stress index is a function of variables including rainfall, minimum temperature and maximum temperature.

The following passages may refer to both the variables of the cow stress index and the grass growth index. The rainfall may be rainfall in the last between 0 and 12 hours, 12 and 24 hours or over 24 hours. Preferably, the rainfall is the rainfall in the last between 20 and 28 hours. Most preferably, the rainfall is rainfall in the last between 22 and 24 hours. The rainfall is rainfall in millimetres (mm). The maximum and/or minimum temperature may be the maximum/minimum respectively temperature of the last between 0-10 hours, 10-24 hours or over 24 hours. Preferably, the maximum and minimum temperature is the maximum and minimum respectively temperature of the last between 20 and 28 hours. The average temperature may be the average temperature over the last between 0 and 12 hours, 12 and 24 hours or over 24 hours.

As the system, including the productivity prediction device, builds and improves the productivity prediction model, the system is preferably adapted to refine, add sophistication and nuances to the one or more correlating patterns. The correlating patters may thereby be periodically refined to increasingly more accurately provide a productivity prediction value. The productivity prediction value may in hindsight increasingly approach the actual productivity value. Accordingly, the productivity prediction device may more increasingly, over time, reliably direct or govern the logistics management system.

Livestock Production Value

The livestock production value may include a range of livestock production. The livestock production value may include a specific value of livestock production. The system may include multiple livestock production values for different livestock on the farm. The livestock production value may include a normal distribution and/or bell curve. The livestock production value may include a probability distribution. The livestock production value may include probability/s that specific livestock production value/s will occur. The livestock production value may include at least one short-term livestock production value and/or at least one long-term livestock production value. Preferably, the long-term livestock production value predicts the livestock production value further into the future than the short-term livestock production value.

The actual livestock production value may be the recorded livestock production value, for example actual number of litres of milk recorded from the farm in the time period.

The livestock production value may include a quantity of milk, weight of livestock, number of livestock births, quantity of manure, likelihood of disease of livestock and other livestock production values. The livestock production value may include the livestock production over the period of time or multiple periods of time.

The system may be adapted such that the livestock production value has any amount of accuracy compared to the actual livestock production value. The system may be adapted such that the livestock production value is accurate to a difference of under 10% from the actual livestock production value. The livestock production value may be accurate to a difference of under 5% from the actual livestock production value. Preferably, the livestock production value is accurate to a difference of under 1% from the actual livestock production value.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention. In describing the various embodiments of the invention, like features will be referred to using like references, with references for features of each embodiment generally preceded by 1, 2, 3, or followed by a Roman numeric sequence, such as i, ii, iii, etc. or an alphabetical sequence such as a, b, c, relative to the corresponding feature of the first embodiment. For example, a feature 10 of the first embodiment may represented as 110, 210, 310, (or n10), or 10a, 10b, 10c, (or 10x) or 10i, 10ii, 10iii, (or 10r) etc. in second, third and fourth embodiments, respectively.

A local productivity prediction and management system including a weather monitoring device and a productivity prediction device. The weather monitoring device 10 including at least one of the following sensors adapted to take weather measurements of local weather conditions. The sensors include a temperature sensor 12, a humidity sensor 13, a rainfall sensor 14 and a sunlight and/or ultraviolet light sensor 15. Wherein, the productivity prediction device is adapted to over time collect local actual livestock production values. The productivity prediction device is also adapted to apply a productivity prediction model which uses one or more correlating patterns between weather measurements and actual livestock production values, whether either are local and/or offsite to provide a set of one or more predicted livestock production values. The productivity prediction device is also adapted to manage a logistical function of livestock product collection and transport with regard to capacity and timing in response to the predicted livestock production value.

Figure 1:
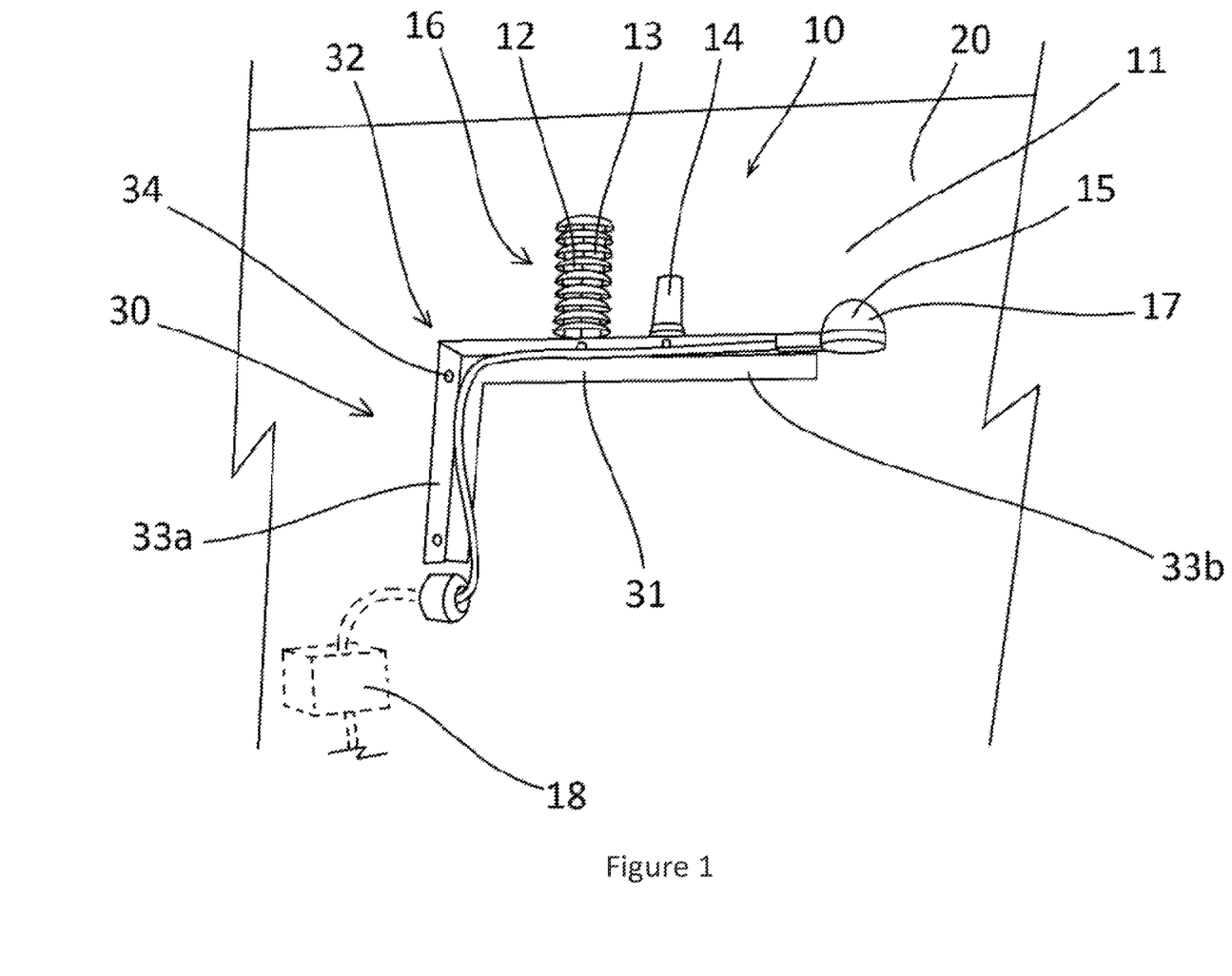
FIG. 1 is a perspective view of a sensor device mounted to a shed.

The weather monitoring device 10 (sensor device) includes a support 30 as seen in FIG. 1. The support 30 includes a beam 31 with a 90° bend/corner 32. A first side 33a of the beam 31 is attached to a shed 20 with bolts 34 and is orientated vertically. The shed 20 may be a house or other structure. The sensors 11 are mounted on a second side 33b of the beam 31 and the second side 33b of the beam 31 is orientated horizontally.

The temperature sensor 12 is located in a layered cylindrical structure 16 which is a shaded location. The temperature sensor 12 may be a thermocouple. The humidity sensor 13 is also located in the layered cylindrical structure 16. The rainfall sensor 14 is a radar precipitation sensor. The sunlight and/or ultraviolet sensor 15 is located in a transparent cover 17.

The sensors 11 are controlled by and send data to a controller 18. The controller 18 includes a central processing unit (CPU), a data storage device, and a communications module. The controller 18 sends and receives data to and from the sensors 11 to take measurements 24 hours a day. The temperature sensor 12 measures temperature. The humidity sensor 13 measures humidity. The rainfall sensor 14 takes measurements including quantity or volume of rainfall in an area. The sunlight and/or ultraviolet sensor 15 takes measurements including intensity of sunlight. The sunlight and/or ultraviolet sensor 15 may also take measurements of the intensity of moonlight. Therefore, the periodic weather measurements (measurements) include temperature, humidity, rainfall and intensity of sunlight.

The measurements also include data from weather predictions. The weather predictions may be taken from news websites or other weather prediction sources. The weather predictions may be for example, predicted temperature, rainfall, humidity and/or intensity of sunlight.

The productivity prediction model is used and/or adjusted by the productivity prediction device. The productivity prediction device may include the sensor device 10, a cloud platform, a server and/or the user's electronic device. The productivity prediction model may include equations with parameters and weightings of parameter. The parameters and weightings of parameters are adjusted over time with artificial intelligence (AI) and/or machine learning. Preferably, the AI runs algorithms to determine more accurate parameters and weightings of parameters. The parameters and weightings of parameters may be adjusted specific to a farm. The parameters and weightings of parameters may be adjusted based on measurements, predicted livestock production values and actual livestock production values of the farm and/or other farms.

Figure 2:
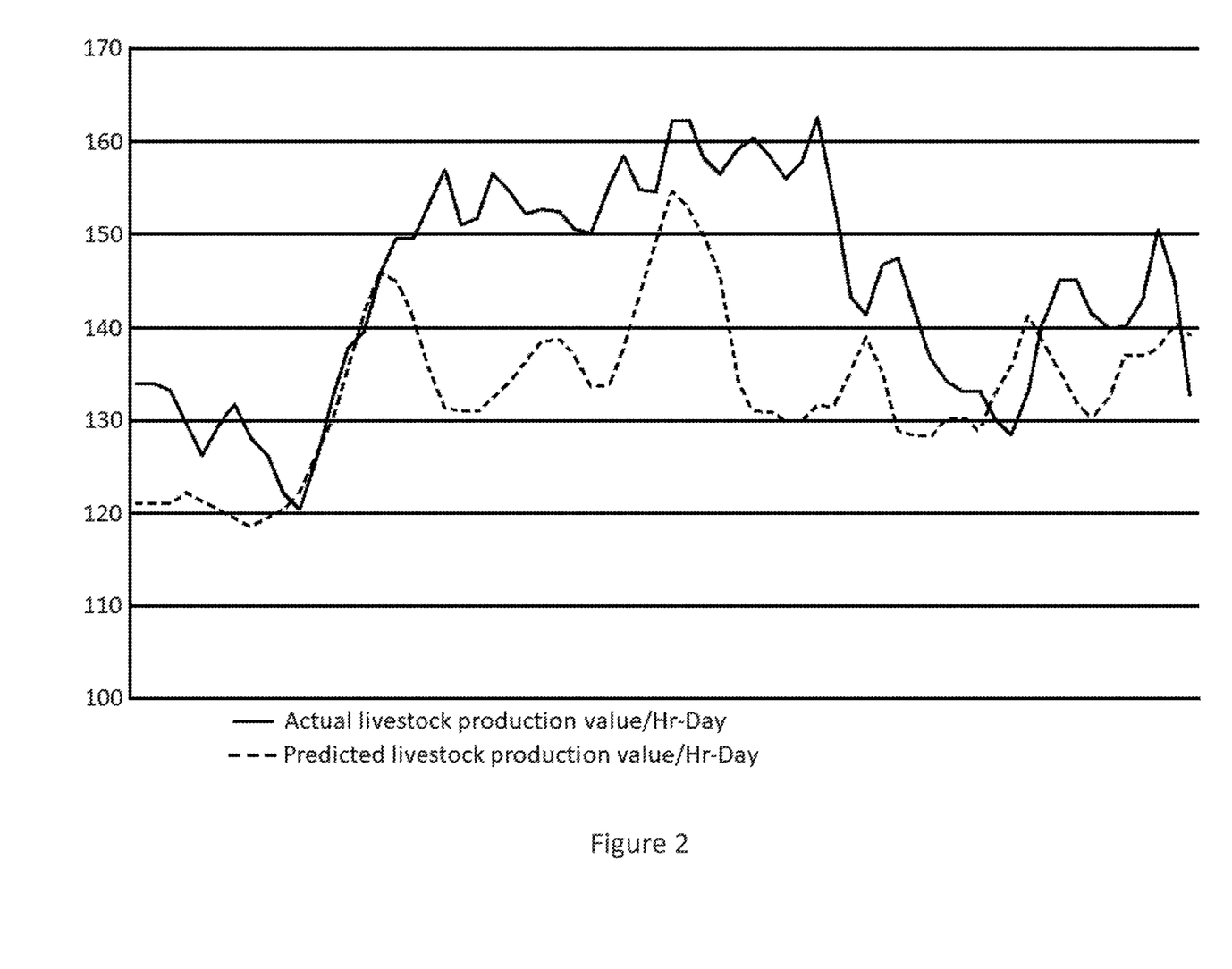
FIG. 2 is a graph showing livestock production values over time and predicted livestock production values over time calculated using a first productivity prediction model.
Figure 4:
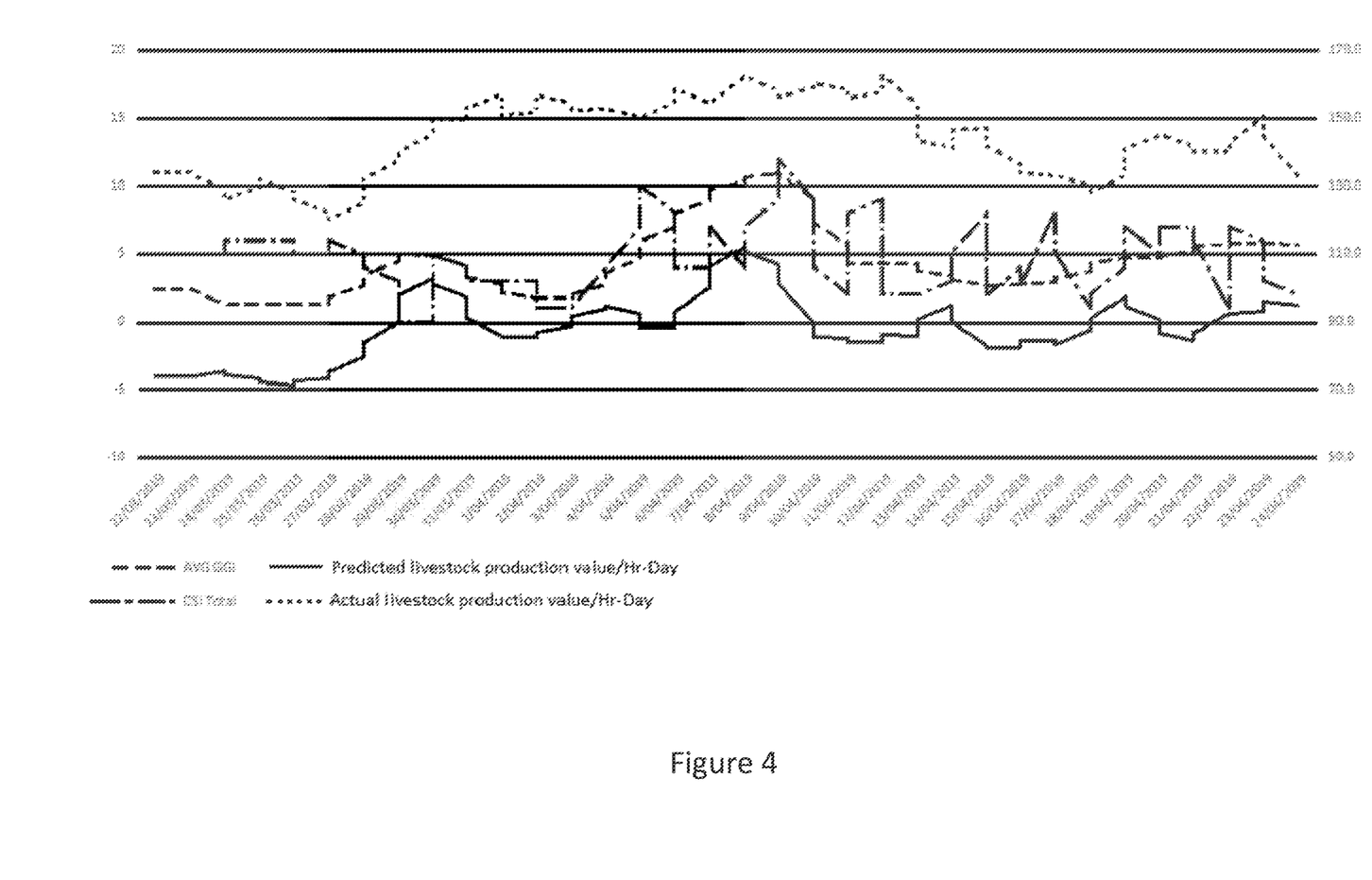
FIG. 4 is a graph showing an average grass growth index over time, cow stress index over time, day livestock production values over time and predicted livestock production values over time calculated using a second productivity prediction model.

It should be noted that the predicted livestock production values shown in FIG. 2 and FIG. 4 are calculated with experimental equations with a view to be improved in the future.

FIG. 2 shows livestock production values recorded in evenings. A vertical axis of FIG. 2 is the livestock production value per hour per day (predicted or actual) and a horizontal axis is time. The livestock production values are litres of milk produced by a farm per hour per day. The farm milks their cows twice a day, in the mornings and evenings. The milk harvested in the evenings is the milk produced by the cows during the day since the last milking. References to production per day is referring to milk harvested in the evenings and references to production per night is referring to milk harvested in the morning. As seen in FIG. 2 as the general trend of actual livestock production values increase, the predicted livestock production values also increase. The predicted livestock production values shown in FIG. 2 were calculated using a first productivity prediction model.

Figure 3:
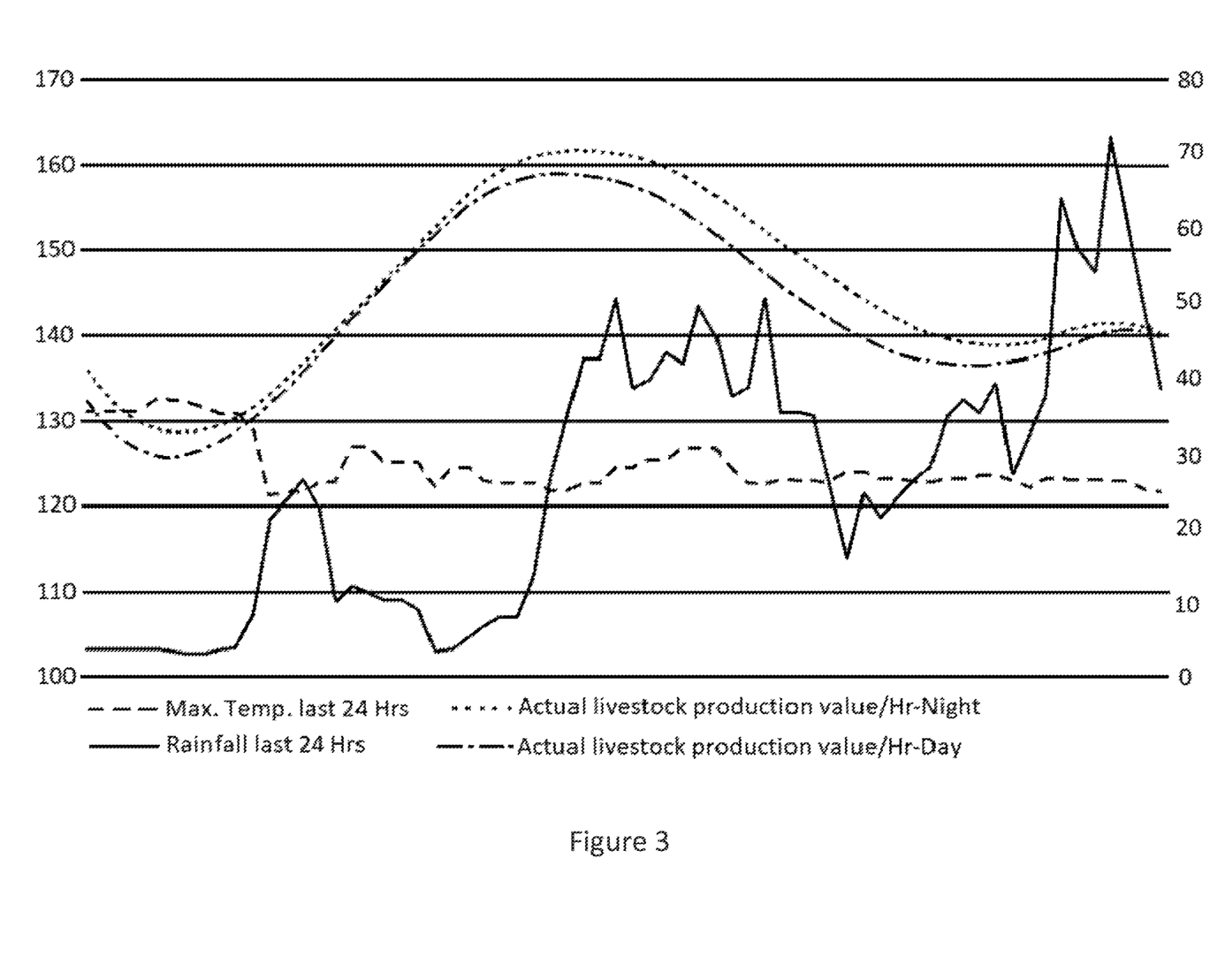
FIG. 3 is a graph showing rainfall and maximum temperature both over the previous 24 hours over time and a polynomial approximation of day and night livestock production values over time.

FIG. 3 shows the maximum temperature over the last 24 hours over time (Max. Temp. last 24 Hrs), rainfall over the last 24 hours over time (Rainfall last 24 hrs), a polynomial approximation of the actual livestock production value per hour per night over time (Actual livestock production value/Hr-Night) and a polynomial approximation of the actual livestock production value per hour per day over time (Actual livestock production value/Hr-Day). A vertical axis on the left side of FIG. 3 includes values which are the actual livestock production value (per hour per night or per hour per day), a vertical axis on the right side of FIG. 3 includes values which are maximum temperature over the last 24 hours and a horizontal axis of FIG. 3 is time. FIG. 3 shows how the actual livestock production value increases after rain (as grass grows) and when temperature decreases (reducing stress for cows). Furthermore, FIG. 3 shows how when large amounts of rain falls (low sun intensity) the grass growth is reduced and therefore livestock production value decreases. These changes in actual livestock production values in response to rain and temperature among other responses are accounted for in the productivity prediction model.

FIG. 4 shows an average grass growth index (AVG GGI) over time, cow stress index (CSI total) over time, actual livestock production value per hour per day over time and predicted livestock production value per hour per day over time calculating using a second productivity prediction model. The following references to axis of FIG. 4 are described when viewing FIG. 4 in landscape. A vertical axis on the left side of FIG. 4 includes values which are the cow stress index or the grass growth index. A vertical axis on the right side of FIG. 4 includes values which are the livestock production value per hour per day (predicted or actual). A horizontal axis of FIG. 4 is time (in the form of dates). The grass growth index is a function of variables, which affects the rate of growth of grass. The grass growth index is a function of rainfall, maximum ambient temperature, minimum ambient temperature and intensity of sunlight. The cow stress index is a function of variables, which affects stress of cows. Stress of cows may be release of certain chemicals/molecules in the cow corresponding to how stressed the cow is. Preferably, the cow stress index is a function of rainfall, maximum ambient temperature, and minimum ambient temperature. The maximum ambient temperature, minimum ambient temperature, intensity of sunlight and rainfall of the grass growth index and the cow stress index are recorded by the weather monitoring device. The rainfall is the amount of rain in millimetres.

The second productivity prediction model includes the following equations. The word "weighting" used in the following equations are the weightings of parameters adjusted over time with AI. The symbol "*" in the following equations represents multiplication. The following equation is used to calculate the grass growth index (GGI):

$$GGI=(weighting*Rainfall)+(weighting*Minimum\ temperature)+(weighting*Maximum\ temperature)+(weighting*Intensity\ of\ sunlight)$$

The following equation is used to calculate the cow stress index (CSI):

$$CSI=(weighting*Rainfall)+(weighting*Minimum\ temperature)+(weighting*Maximum\ temperature)$$

The following equation is used to calculate a predicted livestock productivity value index (PI):

$$PI=(weighting*GGI)-(weighting*CSI)$$

The PI is used to add weightings to each of the GGI and CGI.

The following equation is used to calculate the predicted livestock productivity value (PV):

$$PV=weighted\ average\ of\ last\ PV*PI$$

The "weighted average of last PV" may be the weighted average of PV's calculated over the last between 0 and 12 hours, 12 and 24 hours or over 24 hours. The AI may include the equation calculating the PV. Therefore, the AI may include the weighted average of last PV.

Any of the weightings in the above equations may be optimised for more accurate PV's with AI. The AI may include using trial and error to calculate previous PV's, already knowing the corresponding actual livestock production values. The AI may find the most accurate weightings for all or a subset of all previous PV's on the farm or other farms and use those weightings to calculate future weightings. Preferably, all weightings are specific to each farm. Preferably, all weightings are calculated individually for each farm.

The measurements taken from the sensors 15 are temporarily stored in the controller 18 and sent to and stored in a cloud platform and/or server. The measurements and predicted livestock production value may also be sent to a user's mobile electronic device. The measurements and predicted livestock production value may be viewed on a display of the sensor device 10, on a website through a computer or on an application on the user's mobile electronic device. The display of the sensor device 10 may be located in the shed/existing structure. The measurements may be viewed in graph form showing the measurements over a certain amount of time. The certain amount of time may be pre-set or set by the user. The measurements may be viewed as an average over the certain amount of time. The predicted livestock production values may be viewed in comparison to the actual livestock production values. Alerts may be sent to a user if the measurements or livestock production value go into a set of ranges. The set of ranges may be pre-set or set by the user.

The logistical function may be performed as a consequence of the determination of the predicted livestock production values from at least one farm. The logistical function may include scheduling vehicles to pick up the livestock production at specific times and on specific routes with a view to fill the vehicles to a maximum amount of livestock production and create vehicle routes which allow the vehicles to travel the shortest distance. Preferably, the productivity prediction device includes a computer, which manages the logistical function. Preferably, the computer calculates the shortest vehicle routes, which also allow the vehicles to transport the maximum amount of livestock production. The computer may be the cloud platform, server, in the sensor device, user's electronic device or other computer.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise. In the present specification, the phrase "and/or" refers to severally or any combination of the features. For example, the phrase "feature 1, feature 2 and/or feature 3" includes within its scope any one of the following combinations: Feature 1 or feature 2 or feature 3; feature 1 and feature 2 or feature 3; feature 1 or feature 2 and feature 3; feature 1 and feature 2 and feature 3.

Orientational terms used in the specification and claims such as vertical, horizontal, top, bottom, upper and lower are to be interpreted as relational and are based on the premise that the component, item, article, apparatus, device or instrument will usually be considered in a particular orientation, which will usually be apparent from the context.

It will be appreciated by those skilled in the art that many modifications and variations may be made to the methods of the invention described herein without departing from the spirit and scope of the invention.

The invention claimed is:
1. A local productivity prediction and management system for a farm including a weather monitoring device adapted to be positioned within the borders of the farm and a productivity prediction device, the weather monitoring device including the following sensors adapted to take weather measurements of only local weather conditions on the farm:
   a temperature sensor;
   a rainfall sensor; and
   a sunlight and/or ultraviolet light sensor, wherein, the productivity prediction device uses a productivity prediction model in the form of software that is adapted to:
(a) using artificial intelligence, over time collect local actual livestock production values to establish a correlating pattern between the weather measurements and the actual livestock production values over time, the correlating pattern being in the form of a polynomial approximation that approaches a point of diminishing returns, wherein the correlating pattern includes a parameter of a cow stress index (CSI), according to the following polynomial: CSI=(weighting*Rainfall)+(weighting*Minimum temperature)+(weighting*Maximum temperature);
(b) apply the correlating pattern to provide a set of predicted livestock production values, whereby as a general trend of change in actual livestock production values, the set of predicted livestock production values correspondingly change and the productivity prediction model is adjusted over time to increase the accuracy of the set of predicted livestock production values;
(c) use a vat monitoring device to monitor the amount of livestock dairy produce in at least one vat on the farm;
(d) manage a logistical function of livestock product collection and transport with regard to capacity and timing in response to the set of predicted livestock production values to determine an optimal transport route for livestock produce collection to calculate a vehicle route for the collection of the livestock produce, and
(e) over time the system provides an indication of expected productivity where the standard deviation between actual and predicted livestock production values is less than 5%, in advance of production for a particular day or other period.

2. The local productivity prediction and management system as claimed in claim 1, wherein the correlating pattern includes a parameter of an average grass growth index (GGI), which is a function of rainfall, temperature and intensity of sunlight,
according to the following polynomial:

GGI=(weighting*Rainfall)+(weighting*Minimum temperature)+(weighting*Maximum temperature)+(weighting*Intensity of sunlight).

3. The local productivity prediction and management system as claimed in claim 1, wherein the system is configured to accommodate variations in required capacity and timing corresponding to the predicted livestock production value (PV) and the productivity prediction device predicts the predicted livestock production value using a computer, according to the following polynomial:

PV=weighted average of last PV*PI, where PI=(weighting*GGI)−(weighting*CSI).

4. The local productivity prediction and management system as claimed in claim 1 wherein the logistical function is managed by a computer to schedule a route for the vehicle operable to pick up a maximum amount of livestock production for the vehicle.

5. The local productivity prediction and management system as claimed in claim 4, wherein the computer is or is in at least one server which communicates with the weather monitoring device through the internet.

6. The local productivity prediction and management system as claimed in claim 1, wherein the livestock produce is milk and the predicted livestock value is milk productivity of the livestock.

7. The local productivity prediction and management system as claimed in claim 1, wherein the logistical function plans collection of the agricultural product from multiple farms and each of the farms includes a weather monitoring device according to the weather monitoring device.

8. The local productivity prediction and management system as claimed in claim 7, wherein the productivity prediction device receives the measurements from each of the weather monitoring devices.

9. The local productivity prediction and management system as claimed in claim 7, wherein the productivity prediction device predicts the livestock production value individually for each farm.

10. The local productivity prediction and management system as claimed in claim 1, wherein the productivity prediction device is adapted to account for the amount of livestock produce in the at least one vat measured by the vat monitoring device in managing the logistical function.

11. The local productivity prediction and management system as claimed in claim 1, wherein the productivity prediction device includes weightings for the parameter and uses artificial intelligence (AI) to adjust the weightings based on the correlating pattern, the AI using trial and error, substituting different weightings to calculate predicted livestock productivity values and comparing them to actual livestock productivity values to determine more accurate weightings.

12. A local productivity prediction and management system for a farm including a weather monitoring device adapted to be positioned within the borders of the farm and a productivity prediction device, the weather monitoring device including the following sensors adapted to take weather measurements of only local weather conditions on the farm:
a temperature sensor;
a rainfall sensor; and
a sunlight and/or ultraviolet light sensor,
wherein, the productivity prediction device uses a productivity prediction model in the form of software that is adapted to:
(a) using artificial intelligence, over time collect local actual livestock production values to establish a correlating pattern between the weather measurements and the actual livestock production values over time, the correlating pattern being in the form of a polynomial approximation that approaches a point of diminishing returns, wherein the correlating pattern includes a parameter of an average grass growth index (GGI), which is a function of rainfall, temperature and intensity of sunlight, according to the following polynomial:

GGI=(weighting*Rainfall)+(weighting*Minimum temperature)+(weighting*Maximum temperature)+(weighting*Intensity of sunlight);

(b) apply the correlating pattern to provide a set of predicted livestock production values, whereby as a general trend of change in actual livestock production values, the set of predicted livestock production values correspondingly change and the productivity prediction model is adjusted over time to increase the accuracy of the set of predicted livestock production values;
(c) use a vat monitoring device to monitor the amount of livestock dairy produce in at least one vat on the farm;

(d) manage a logistical function of livestock product collection and transport with regard to capacity and timing in response to the set of predicted livestock production values to determine an optimal transport route for livestock produce collection to calculate a vehicle route for the collection of the livestock produce; and (e) over time the system provides an indication of expected productivity where the standard deviation between actual and predicted livestock production values is less than 5%, in advance of production for a particular day or other period.

13. The local productivity prediction and management system as claimed in claim 12, wherein the system is configured to accommodate variations in required capacity and timing corresponding to the predicted livestock production value (PV) and the productivity prediction device predicts the predicted livestock production value using a computer, according to the following polynomial:

$$PV = \text{weighted average of last } PV*PI,$$

where $PI = (\text{weighting}*GGI) - (\text{weighting}*CSI)$.

14. The local productivity prediction and management system as claimed in claim 2, wherein the system is configured to accommodate variations in required capacity and timing corresponding to the predicted livestock production value (PV) and the productivity prediction device predicts the predicted livestock production value using a computer, according to the following polynomial:

$$PV = \text{weighted average of last } PV*PI$$

where $PI = (\text{weighting}*GGI) - (\text{weighting}*CSI)$.

15. The local productivity prediction and management system as claimed in claim 14, wherein the logistical function is managed by a computer to schedule a route for the vehicle operable to pick up a maximum amount of livestock production for the vehicle.

* * * * *